(12) United States Patent
Degelsegger

(10) Patent No.: US 6,421,968 B2
(45) Date of Patent: Jul. 23, 2002

(54) FIRE WALL

(75) Inventor: Walter Degelsegger, Desselbrunn (DE)

(73) Assignee: DORMA GmbH + Co. KG, Ennepetal (DE)

(*) Notice: Subject to any disclaimer, the term of this patent is extended or adjusted under 35 U.S.C. 154(b) by 0 days.

(21) Appl. No.: 09/813,186

(22) Filed: Mar. 20, 2001

Related U.S. Application Data (63) Continuation-in-part of application No. PCT/EP00/06888, filed on Jul. 19, 2000.

(51) Int. Cl.[7] .................................................. E06B 9/01
(52) U.S. Cl. .................. 52/204.62; 52/582.1; 52/786.1; 52/784.11; 52/235
(58) Field of Search ........................... 52/582.1, 204.62, 52/235, 232, 784.11, 786.1, 786.11

(56) References Cited

U.S. PATENT DOCUMENTS

| 4,435,935 A | * | 3/1984 | Larrea |
| 4,610,115 A | * | 9/1986 | Thompson |
| 4,997,687 A | * | 3/1991 | Carter |
| 5,490,358 A | * | 2/1996 | Grunewald |
| 5,592,795 A | * | 1/1997 | Rinehart |
| 5,816,017 A | * | 10/1998 | Hunt |

FOREIGN PATENT DOCUMENTS

| DE | DAS 1033394 | * | 7/1958 |
| DE | 2742665 | | 3/1978 |
| DE | 2645259 | | 4/1978 |
| DE | 3438876 | | 4/1986 |
| DE | 3714629 | | 11/1988 |
| DE | 4123977 | | 1/1993 |
| DE | 19543148 | | 5/1997 |
| DE | 19733381 | | 3/1998 |
| EP | 0401555 | | 12/1990 |
| EP | 0444393 | | 9/1991 |
| EP | 0472109 | | 2/1992 |
| EP | 1020605 | | 7/2000 |
| FR | 2662739 | | 12/1991 |
| GB | 425607 | * | 8/1935 |
| JP | 0197658 | * | 8/1990 |
| WO | 9634169 | | 10/1996 |

* cited by examiner

Primary Examiner—Carl D. Friedman
Assistant Examiner—Kevin McDermott
(74) Attorney, Agent, or Firm—Nils H. Ljungman & Associates (57) ABSTRACT

Firewall that is used in an area of a fire compartment to prevent fire from skipping to other areas, whereby the fire wall is comprised of modularly constructed sub-elements which are essentially composed of profiles assembled to form a surrounding frame that simultaneously separate two glass panes, whereby the glass panes extend to the outer edge of the profiles, and the frame is covered by a partial enameling of the glass panes, and the sub-elements can be connected to each other by connecting elements with the interposition of fireproof laminates.

20 Claims, 2 Drawing Sheets

FIRE WALL

CONTINUING APPLICATION DATA

This application is a Continuation-In-Part application of International Patent Application No. PCT/EP00/06888, filed on Jul. 19, 2000, which claims priority from Federal Republic of Germany Patent Application No. 199 33 400.5, filed on Jul. 21, 1999. International Application No. PCT/EP00/06888 was pending as of the filing date of this application. The United States was an elected state in International Application No. PCT/EP00/06888.

BACKGROUND OF THE INVENTION

1. Field of the Invention

This invention relates to a fire wall that can be used in an area of a fire compartment to keep fire inside one fire compartment from skipping to other areas.

2. Background of the Invention

A fire door of this type is described, for example, in European Patent 0 401 555 A2, where a glass pane is inserted inside a metal frame that has a surrounding receptacle groove. The glass panel thereby ends before it reaches the frame and is connected to the metal frame by additional metal edge strips that are fastened to the glass pane and function as adapters. The metal strips are thereby attached using a conventional fireproof adhesive, e.g. one based on water glass.

A frame profile for fire doors is described in European Patent 0 444 393 A2, in which a glass pane is held in place by a strong frame profile. The frame profile is realized in the form of a hollow chamber or cellular profile and has fireproof or fire-resistant plates inserted into the chambers to guarantee the fire resistance of such a door.

A fire-resistant glazing is described in German Patent 26 452 59 A1. Silicate glass panes made of pre-stressed glass are used on the one side of an air gap between the two panes, and a reinforced silicate glass pane is used on the other side. The construction of a fire-resistant glazing of this type is achieved by a metal frame that borders and covers or overlaps these panes on the edges.

German Patent 27 42 665 A1 shows a fire-resistant swinging door in which the door frame or the edges of the panels have a thermal insulation material that extends over the entire length or width. This thermal insulation material swells under the effect of heat, so that in the event of a fire, the element automatically creates a secure barrier against the fire. This door consists of a sheet material that is not transparent and is interrupted in one portion by an inserted window.

Fire walls are also constructed using fireproof masonry materials. However, if firewalls are to be used in buildings with contemporary architecture, the firewalls are not the type generally described by the prior art. The current trend is to light the interiors of buildings with natural light, i.e. to make the structures transparent. In that case, it is naturally impossible to use a wall made of fireproof masonry materials. The object of the invention is therefore to create a fire wall that can be manufactured with some degree of flexibility from an economic point of view, and can then be installed or retrofitted in buildings of the architectural style described above. An additional consideration in approaching the object of the invention is an increased level of safety.

OBJECT OF THE INVENTION

The invention teaches that this object is accomplished by the fact that the fire wall consists of modularly constructed sub-elements which are essentially composed of profiles assembled to form a surrounding frame that simultaneously separates two glass panes, whereby the glass panes extend to the outer edge of the profiles, and the frame is covered by a partial enameling of the glass panes, and the sub-elements can be connected to each other by connecting elements with the interposition of fireproof laminates. Further features of the invention are described herein.

SUMMARY OF THE INVENTION

The invention teaches that the firewall is manufactured from modularly constructed sub-elements. The sub-elements thereby consist essentially of a surrounding frame that is assembled from individual profiles. The frame is covered by glass panes so that the glass panes, which are separated from each other, extend beyond the frame. The profiles of the frame thereby enclose the glass panes on the edges. So that the frame will not be not visible, it is covered by a partial enameling of the glass panes and/or of the frame.

The profiles are constructed so that they have at least one cavity that has a an opening or depression toward the other edges. On one hand, an edge profile can be inserted in this opening, plus a connecting element that positively and non-positively connects at least two sub-elements to each other, for example. In the vicinity of the adjacent edge profiles, in each of the edge profiles, there is a fireproof laminate that swells under the action of heat so that a hermetically sealed firewall is created. Surrounding the edge profiles on each edge are also T-grooves, into which seal elements are inserted. The result is a hermetic sealing of the sub-elements in a wall or masonry wall opening.

The connecting element, which can be used in a number of different models to connect sub-elements to one another, is realized in the form of a rod-shaped or bar-shaped element. On the end of the rod or bar there are hook elements that are positively and non-positively attached to the rod. In the middle of the rod or bar, a rotation or twisting mechanism is attached, which makes it possible, using a tool, to rotate the connecting elements after they have been inserted in the frames. The purpose of the rotation is to cause the hook elements to hook into the cavity of the profile, after which it is no longer possible to pull the sub-elements apart. The rotation mechanism can, for example, be a square nut or hex nut that is positively and non-positively attached to the rod or bar. It is also possible, however, to attach a disc or washer at this point, on the periphery of which there are corresponding borings that make it possible to apply a tool.

Both the profile for the frame and the edge profile can be made of plastic, steel, wood or light alloy. If a plastic is used for the manufacturing, the invention teaches that preference should be given to the use of a fiberglass-reinforces plastic that is resistant to fire.

Depending on the fire protection class required, the specified fire resistance of such a fire wall can be achieved by the separated panes. To achieve a higher fire protection class, the gap between the separated panes can either be filled by a fireproof gel, or can be provided with greater fire resistance by using a special fireproof glass.

It has been shown that as a result of the modular construction of the fire wall, and using identical basic components, such as the frame and the safety glass panes, for example, and simply by adding the fire protection gel or the fireproof glass, it becomes possible to create an outwardly identical firewall, but one that is transparent and has greater fire-resistance.

It goes without saying that a fire door can also be installed in such a fire wall. A fire door or a fire window of this type can be realized in the form of a single-panel or double-panel side-hung or casement door, although it can also be realized in the form of a swinging door. A fire door or a fire window of this type would be constructed using the same basic materials as those used for the firewalls or the type described above.

In one realization of the teaching of the invention, the above mentioned glass panes can be omitted, and fire-resistant material of steel, plastic, light alloy or an appropriate wood can be used instead.

The above-discussed embodiments of the present invention will be described further hereinbelow. When the word "invention" is used in this specification, the word "inveniton" includes "inventions", that is, the plural of "invention." By stating "invention", the applicant does not in any way admit that the present application does not include more than one patentably and non-obvious distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Hereinafter, the invention is explained on the basis of different diagrammatically represented embodiment examples. They show.

DESCRIPTION OF THE PREFERRED EMBODIMENT

Figure 1:
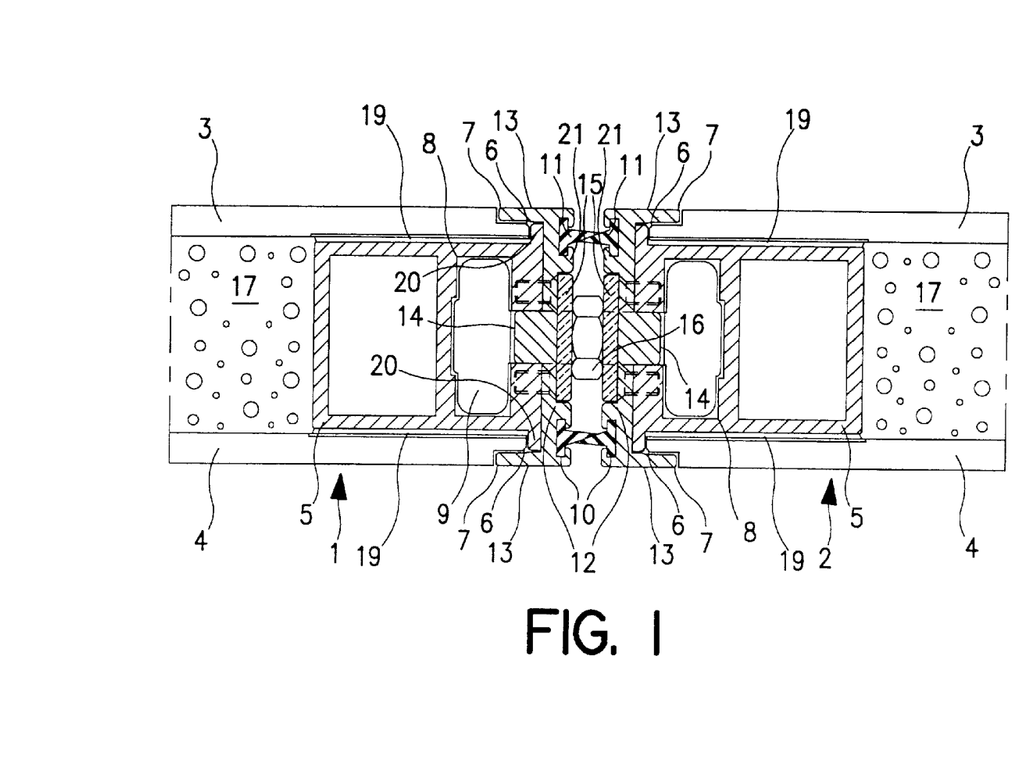
FIG. 1: is a sectional view through a connection of two sub-elements, shown as a detail drawing.

FIG. 1 shows two sub-elements that are connected with each other and designated 1 and 2. The sub-elements 1 and 2 shown in this exemplary embodiment are identical to each other and are connected to each other by a frame (not numbered) formed by profiles 5, and simultaneously two glass panes 3 and 4 that are separated from each other by some distance. The profile 5 thereby contains at least one cavity 8. In the exemplary embodiment illustrated in FIG. 1, the profile 5 has two cavities. In the area in which the profile 5 comes in contact with the glass panes 3 and 4, a partial enameling 19 is applied, the purpose of which is to prevent the frame from being visible. It is also possible however, to install the frame so that it remains visible between the separated glass panes 3 and 4, whereby the glass panes 3, 4 are always positively and non-positively connected with the frame.

The profile 5 has, on its edge side, i.e. on the edge of the sub-element 1 or 2, lateral projections or protrusions 20 that cover the edges 6 of the glass panes 3 and 4. Thus there is simultaneously effective protection of these edges 6 of the glass panes. In the exemplary embodiment illustrated in FIG. 1, the glass panes 3 and 4 have a recess 7 in the vicinity of the edges 6 of the glass panes. The invention also teaches that it is possible, however, for the edges 6 of the glass panes to be beveled at this point. The profile 5 with its projections 20 is covered by an edge profile 12. The edge profile 12 has a projection 14 that is inserted into a groove in the profile 5. The profile is thereby securely and correctly held in position, and can be positively and non-positively connected with the profile 5 by appropriate threaded fasteners.

The edge profile 12 has projections 13 on its ends, which projections are designed so that they cover the recesses 7 on the edges 6 of the glass panes. In an outer contour 21 of the edge profile 12, near the lateral edges, there are T-grooves 10 into which seals 11 are inserted. From the exemplary embodiment illustrated in FIG. 1 it is apparent that when the sub-elements are joined together, the use of the seals 11 results in a closed facade, and thereby prevents the penetration of smoke. In the outer contour 21 there is also a recess in which a fireproof laminate 15 is inserted. The purpose of this fireproof laminate is to swell up under the action of the increased temperature when a fire breaks out and thereby seal the sub-elements 1, 2 to each other, as well as against the ceiling and the wall, and thus guarantee a secure fire compartment.

Figure 2:
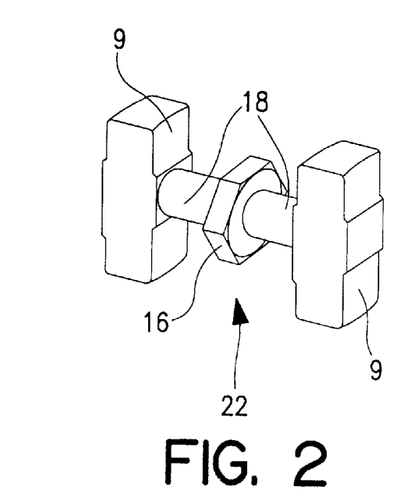
FIG. 2: shows a connecting element.

To connect the sub-elements 1 and 2 to each other, a connecting element 22 of the type illustrated in FIG. 2 is used. The connecting element 22 consists essentially of a rod or bar 18, to the respective ends of which hook elements 9 are positively and non-positively attached. In the middle of the rod or bar 18 there is a rotation mechanism, which can be realized, for example, in the form of a square nut or a hex nut. It is also conceivable, however, that corresponding borings can be made at this point either directly in the rod or bar 18, or using a disk or washer, to effect a rotation of the connecting element 22 into its final position during use. The hook elements 9 thereby engage in the cavity 8 of the profile 5 on one hand, and are simultaneously pushed apart by the rotation mechanism 16. A defined distance between the sub-elements 1 and 2 can be guaranteed by the selection of the correct dimensions. The rotation of the connecting element 22 by means of the rotation mechanism 16, which can be done by pushing back the seals 11, creates a secure positive and non-positive connection of the sub-elements 1 and 2 to each other. The same method can be used to create the connection on top and on the bottom when the sub-elements are used inside a building. It is also possible to incorporate skylights inside the fire wall.

To connect the sub-elements 1, 2 to existing walls, ceilings and floors, the same profiles 5 can be used on the walls, floors and ceilings, for example, to make possible attachments and connections.

Figure 1A:
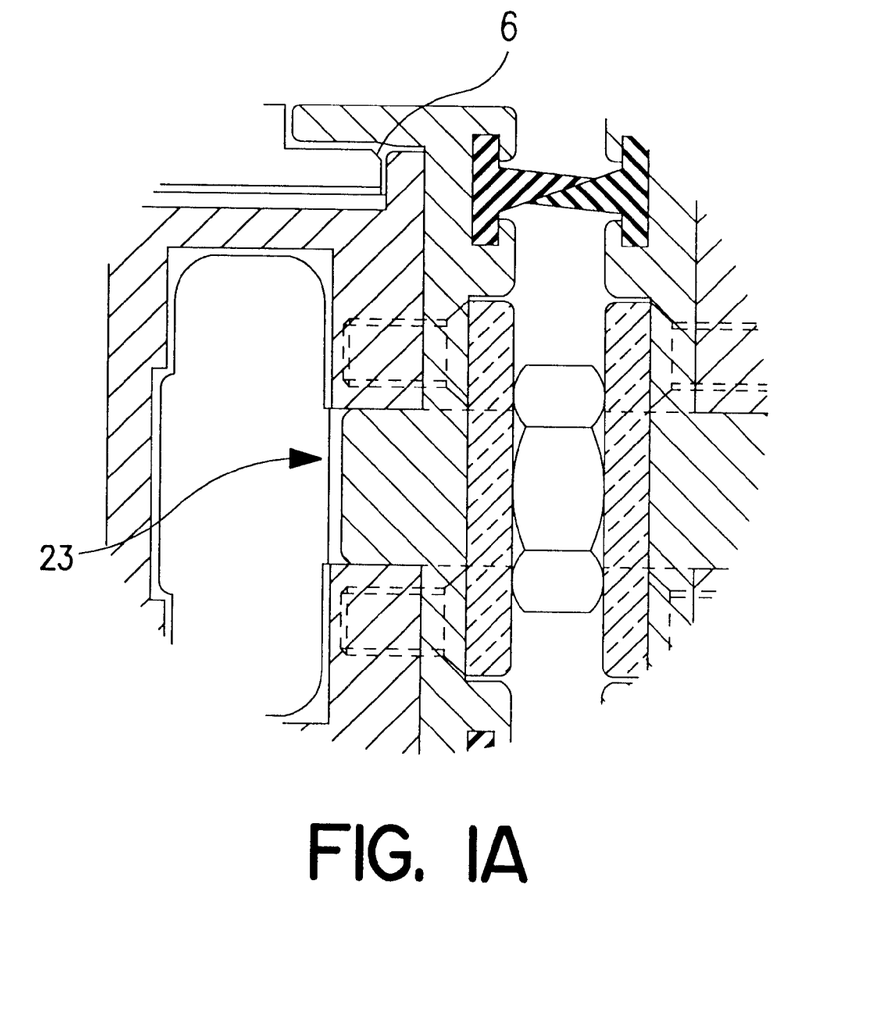
FIG. 1A: shows a blown-up view of a section of FIG. 1, with additional details.

FIG. 1A shows a blown-up view of a section of FIG. 1, with additional details. Specifically, the beveled design of the edge 6 of the glass pane is shown in more detail. The opening or hole 23 in the profile 5 at the central portion of the wall element is also indicated.

One feature of the invention resides broadly in a firewall that is used in an area of a fire compartment to prevent fire from skipping to other areas, characterized by the fact that the fire wall consists of modularly constructed sub-elements 1, 2, which are essentially composed of profiles 5 assembled to form a surrounding frame that simultaneously separates two glass panes 3, 4, whereby the glass panes 3, 4 extend to the outer edge of the profiles, and the frame is covered by a partial enameling 19 of the glass panes, and the sub-elements 1, 2 can be connected to each other by connecting elements 9 with the interposition of fireproof laminates 15.

Another feature of the invention resides broadly in a fire wall characterized by the fact that there is a transparent fireproofing agent between the separated glass panes 3, 4.

Yet another feature of the invention resides broadly in a fire wall characterized by the fact that the profile 5 has at least one cavity 8, whereby the cavity 8 has an opening or depression that is suitable for the connection or additional profiles or for the use of the connecting elements 22.

Still another feature of the invention resides broadly in a fire wall characterized by the fact that the profile 5 has projections 20 on each side that cover some or all of the edges 6 of the glass panes 3, 4.

A further feature of the invention resides broadly in a fire wall characterized by the fact that the glass panes 3, 4, in the vicinity of the edges 6, have recesses 6 that are occupied by legs 13 of an edge profile 12.

Another feature of the invention resides broadly in a fire wall characterized by the fact that the glass panes 3, 4 have beveled edges in the vicinity of the edges 6 of the glass panes, which beveled edges are covered by the edge profile 12.

Yet another feature of the invention resides broadly in a fire wall characterized by the fact that an outer contour 21 of the edge profile 12 is interrupted on each side by a T-groove 10.

Still another feature of the invention resides broadly in a fire wall characterized by the fact that a seal 11 is inserted in the T-groove 10.

A further feature of the invention resides broadly in a fire wall characterized by the fact that at least one fireproof laminate 15 is integrated in the outer contour 21.

Another feature of the invention resides broadly in a fire wall characterized by the fact that the edge profile 12 can be connected in the profile 5.

Yet another feature of the invention resides broadly in a fire wall characterized by the fact that the connecting element 22 is a rod-shaped component, with a rotation mechanism 16 located in the middle, whereby hook elements 9 are positively and non-positively attached to each end.

Still another feature of the invention resides broadly in a fire wall characterized by the fact that the rotation mechanism 16 has a square nut or a hex nut.

A further feature of the invention resides broadly in a fire wall characterized by the fact that the rotation mechanism 16 is formed by borings in the rod 18.

Another feature of the invention resides broadly in a fire wall characterized by the fact that the hook elements 22 are engaged through the opening in the profile 5, and can be fixed in position in the sub-elements 1, 2 by the rotation of the connecting elements and simultaneously connect the sub-elements 1, 2 with each other.

Yet another feature of the invention resides broadly in a fire wall characterized by the fact that the profile 9 and the edge profile 12 are made of plastic, steel, wood or light alloy.

Still another feature of the invention resides broadly in a fire wall characterized by the fact that the plastic is a fiberglass-reinforced plastic.

A further feature of the invention resides broadly in a fire wall characterized by the fact that a fire door is installed in the fire wall.

Another feature of the invention resides broadly in a fire wall characterized by the fact that the fire door is a single-panel or double-panel side-hung door.

Yet another feature of the invention resides broadly in a fire wall characterized by the fact that the fire door is a single-panel or double-panel swinging door.

Still another feature of the invention resides broadly in a fire wall characterized by the fact that the glass panes 3, 4 are made of a safety glass.

A further feature of the invention resides broadly in a fire wall characterized by the fact that the fireproofing agent is a fireproofing gel.

Another feature of the invention resides broadly in a fire wall characterized by the fact that the fireproofing agent is a fireproof glass.

Yet another feature of the invention resides broadly in a fire wall characterized by the fact that the glass panes 3, 4 are replaced by non-transparent sheet materials.

Still another feature of the invention resides broadly in a fire wall characterized by the fact that the material consists of plastic, wood, steel or light alloy.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. 199 33 400.5, filed on Jul. 21, 1999, having inventor Walter DEGELSEGGER, and International Application No. PCT/EP00/06888, filed on Jul. 19, 2000 as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

U.S. patent application Ser. No. 09/813,193, filed on Mar. 20, 2001, having the inventor Walter DEGELSEGGER, with Attorney Docket No. NHL-DOR-85, and claiming priority from Federal Republic of Germany Patent Application No. 199 33 410.2, which was filed on Jul. 21, 1999 and International Patent Application PCT/EP00/06884, which was filed on Jul. 19, 2000 as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

U.S. patent application Ser. No. 09/812,424, filed on Mar. 20, 2001, having the inventor Walter DEGELSEGGER, with Attorney Docket No. NHL-DOR-89, and claiming priority from Federal Republic of Germany Patent Application No. 199 33 406.4 , which was filed on Jul. 21, 1999 and International Patent Application PCT/EP00/06886, which was filed on Jul. 19, 2000 as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

U.S. patent application Ser. No. 09/812,974, filed on Mar. 20, 2001, having the inventor Walter DEGELSEGGER, wit Attorney Docket No. NHL-DOR-90, and claiming priority from Federal Republic of Germany Patent Application No.

199 33 408.0, which was filed on Jul. 21, 1999 and International Patent Application PCT/EP00/06893, which was filed on Jul. 19, 2000 as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The following standards or codes, namely: ASTM D 523 entitled "Standard Test Method for Specular Gloss"; ASTM D635 entitled "Standard Test Method for Rate of Burning and/or Extent of and Time of Burning of Self-supporting Plastics in a Horizontal Position"; ASTM E 84 entitled "Standard Test Method for Surface Burning Characteristics of Building Materials"; ASTM E 152 entitled "Standard Methods of Fire Tests of Door Assemblies"; NFPA 252 entitled "Standard Methods of Fire Tests of Door Assemblies"; and UL 10B entitled "Standard for Fire Tests of Door Assemblies"; and hereby incorporated by reference as if set forth in their entirety herein.

The terms fire rated, fire resistant, fire protection, and flame retardant are used herein interchangeably.

The term fire protection laminate or the like terminology is to mean, inter alia, a seal or similar structure made of intumescent material that expands in the event of a predetermined temperature or heat of fire. This expanded structure will then serve to seal off the space of a corresponding gap, say between adjacent elements, to thereby enhance the fire rated capability of the fire rated panel or partition, and associated components.

Some examples of fire resistant plastic, or polymeric or synthetic, materials which may possibly be incorporated in an embodiment of the present invention are to be found in: U.S. Pat. No. 4,017,457 issued to Baron et al. on Apr. 12, 1977 and entitled "Flame retardant polycarbonate compositions"; U.S. Pat. No. 4,035,447 issued to Tonoki et al. on Jul. 12, 1977 and entitled "Fire resistant polymer composition"; U.S. Pat. No. 4,101,498 issued to Snyder on Jul. 18, 1978 and entitled "Fire-resistant composition"; U.S. Pat. No. 5,444,809 issued to Aoki et al. on Aug. 22, 1995 and entitled "Flame retardant resin composition and flame retardant plastic optical fiber cable using the same"; U.S. Pat. No. 4,119,612 issued to Vollkommer et al. on Oct. 10, 1978 and entitled "Polymeric and oligomeric formals"; U.S. Pat. No. 4,650,823 issued to Krishnan et al. on Mar. 17, 1987 and entitled "Iron oxide pigmented, polycarbonate compositions"; U.S. Pat. No. 5,276,077issued to Schwane et al. on Jan. 4, 1994 and entitled "Ignition resistant carbonate polymer blends"; U.S. Pat. No. 5,298,299 issued to Shea on Mar. 29, 1994 and entitled "Double wall fire proof duct"; U.S. Pat. No. 5,326,805 issued to Sicken et al. on Jul. 5, 1994 and entitled "Flame-retardant plastics molding composition of improved stability"; U.S. Pat. No. 5,329,972 issued to Guiton on Jul. 19, 1994 and entitled "Fire resistant plastic structure"; U.S. Pat. No. 5,444,809 issued to Aoki et al. on Aug. 22, 1995 and entitled "Flame retardant resin composition and flame retardant plastic optical fiber cable using the same"; U.S. Pat. No. 5,571,888 issued to Cheng et al. on Nov. 5, 1996 and entitled "Process for preparing flame-retardant phosphorous-containing unsaturated polyester"; and U.S. Pat. No. 6,110,559 issued to De Keyser on Aug. 29, 2000 and entitled "Plastic article having flame retardant properties", all of these U.S. patents being hereby expressly incorporated by reference as if set forth in their entirety herein.

Some examples of fire resistant materials which possibly may be incorporated in an embodiment of the present invention are to be found in: U.S. Pat. No. 3,983,082 issued to Pratt et al. on Sep. 28, 1976 and entitled "Intumescent fire retardant material and article"; U.S. Pat. No. 4,052,526 issued to Pratt et al. on Oct. 4, 1977 and entitled "Intumescent fire retardant material and article"; U.S. Pat. No. 4,065,394 issued to Pratt et al. on Dec. 27, 1977 and entitled "Intumescent fire retardant material"; U.S. Pat. No. 4,235,836 issued to Wassell et al. on Nov. 25, 1980 and entitled "Method for making thermal insulating, fire resistant material"; U.S. Pat. No. 4,246,358 issued to Ellard on Jan. 20, 1981 and entitled "Fire-resistant material and process"; U.S. Pat. No. 4,265,317 issued to Knecht on May 5, 1981 and entitled "Fire resistant material"; U.S. Pat. No. 4,810,741 issued to Kim and entitled "Fire-resistant material, noncombustible material for treating interior building material and processes for their production"; U.S. Pat. No. 5,401,793 issued to Kobayashi et al. on Mar. 28, 1995 and entitled "Intumescent fire-resistant coating, fire-resistant material, and processes for producing the fire-resistant material"; U.S. Pat. No. 6,001,285 issued to Wunram on Dec. 14, 1999 and entitled "Fire-retardant material and a method for the manufacture of such a material"; and U.S. Pat. No. 6,159,878 issued to Marsh on Dec. 12, 2000 and entitled "Layered reflecting and photoluminous fire resistant material," all of these U.S. patents being hereby expressly incorporated by reference as if set forth in their entirety herein.

Some examples of fire retardant fillers which possibly may be incorporated in an embodiment of the present invention are to be found in: U.S. Pat. No. 4,254,177 issued to Fulmer on Mar. 3, 1981 and entitled "Fire-retardant product and method of making"; U.S. Pat. No. 4,391,924 issued to Uram, Jr. on Jul. 5, 1983 and entitled "High temperature thermobarrier compositions"; U.S. Pat. No. 4,619,954 issued to Warner, II on Oct. 28, 1986 and entitled "Fiberglass reinforced plastic sheet material with fire retardant filler"; U.S. Pat. No. 4,746,565 issued to Bafford et al. on May 24, 1988 end entitled "Fire barrier fabrics"; U.S. Pat. No. 4,839,222 issued to Jain on Jun. 13, 1989 and entitled "Fiberglass insulation coated with a heat collapsible foam composition"; U.S. Pat. No. 5,039,718 issued to Ashley et al. on Aug. 13, 1991 and entitled "Fillers"; U.S. Pat. No. 5,279,894 issued to Hoffman et al. on Jan. 18, 1994 and entitled "Curable silicone compositions and non-flammable cured products obtained therefrom"; U.S. Pat. No. 5,378,519 issued to Chen on Jan. 3, 1995 and entitled "Cross-linked melt processible fire-retardant ethylene polymer compositions"; U.S. Pat. No. 5,474,602 issued to Brown et al. on Dec. 12, 1995 and entitled "Treatment of magnesium hydroxide and its use as plastics filler"; and U.S. Pat. No. 6,100,359 issued to Ghatan on Aug. 8, 2000 and entitled "Ablative polyurea foam and prepolymer", all of these U.S. patents being hereby expressly incorporated by reference as if set forth in their entirety herein.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

All of the patents, patent applications or patent publications, which were cited in the PCT Search Report dated Nov. 2, 2000, and/or cited elsewhere are hereby incorporated by reference as if set forth in their entirety herein as follows: German Patent No. 41 23 977 A to FACHVERBAND GLASDACH UND METAL, PROMAT GMBH, Jan. 21, 1993; German Patent No. 197 33 381 A to GEZE GMBH & CO, Mar. 26, 1998; German Patent No. 195 43 148 A to FEWA GLASTECHNIK GMBH, May 22, 1997; French Patent No. 2 662 739 to KIRC, Pierre, Dec. 6, 1991; German Patent No. 37 14 629 to HENKENJOHANN, Johan, Nov. 17, 1988; WO 96 34169 to DORMA GMBH & CO KG, Oct. 31, 1996; German Patent No. 34 38 876 A to RUETEBAU GMBH, Apr. 24, 1986; European Patent No. 0 472 109 to GARTNER & CO. J., Feb. 26, 1992.

The details in the patents, patent applications and publications maybe considered to be incorporable, at applicant's option, into the claims during prosecution as further limitations in the claims to patentably distinguish any amended claims from any applied prior art.

Some examples of fire rated gels which may possibly be incorporated in an embodiment of the present invention may be found in: U.S. Pat. No. 5,855,713 issued to von Bonin, et al. on Mar. 23, 1999 and entitled "Fire-resistant glass containing a gel with improved melting resistance, and process for the preparation thereof"; U.S. Pat. No. 5,653,839 issued to Itoh, et al. on Aug. 5, 1997 and entitled "Fire-resistant glass and process for production thereof"; U.S. Pat. No. 5,624,998 issued to Itoh, et al. on Apr. 29, 1997 and entitled "Hardenable composition, aqueous gel and applications"; U.S. Pat. No. 5,519,088 issued to Itoh, et al. on May 21, 1996 and entitled "Hardenable composition, aqueous gel and applications thereof"; U.S. Pat. No. 5,496,640 issued to Bolton, et al. on Mar. 5, 1996 and entitled "Fire resistant transparent laminates"; U.S. Pat. No. 5,217,764 issued to Eich on Jun. 8, 1993 and entitled "Fire protection glazing", all of these U.S. patents being hereby expressly incorporated by reference herein.

Some examples of transparent fire protection which may possibly be incorporated in an embodiment of the present invention may be found in: U.S. Pat. No. 5,462,805 issued to Sakamoto, et al. on Oct. 31, 1995 and entitled "Fire-protection and safety glass panel"; U.S. Pat. No. 5,425,901 issued to von Bonin, et al. on Jun. 20, 1995 and entitled "Fireproofing gels, processes for their preparation and their use, in particular for fireproof glazing"; U.S. Pat. No. 5,230,954 issued to Sakamoto, et al. on Jul. 27, 1993and entitled "Fire-protection and safety composite glass panel"; U.S. Pat. No. 5,217,764 issued to Eich on Jun. 8, 1993 and entitled "Fire protection glazing"; U.S. Pat. No. 6,159,606 issued to Gelderie, et al. on Dec. 12, 2000 and entitled "Fire-resistant glazing panel"; U.S. Pat. No. 5,543,230 issued to von Bonin, et al. on Aug. 6, 1996 and entitled "Laminated glass construction having an intermediate layer of a fire-proofing gel"; U.S. Pat. No. 4,873,146 issued to Toussaint, et al. Oct. 10, 1989 and entitled "Transparent fire-screening panels", all of these U.S. patents being hereby expressly incorporated by reference herein.

An example of fire rated glass which may possibly be incorporated in an embodiment of the present invention may be found in: U.S. Pat. No. 5,910,620 issued to O'Keeffe, et al. on Jun. 8, 1999 and entitled "Fire-rated glass and method for making same", this U.S. patents being hereby expressly incorporated by reference herein.

Some examples of fire protection glass panes which may possibly be incorporated in an embodiment of the present invention may be found in: U.S. Pat. No. 5,380,569 issued to Kujas, et al. on Jan. 10, 1995 and entitled "Fire resistant glass partition"; U.S. Pat. No. 5,776,844 issued to Koch, et al. Jul. 7, 1998 and entitled "Compositions of silico-sodo-calcic glasses and their applications"; U.S. Pat. No. 5,958,812 issued to Koch, et al., Sep. 28, 1999 and entitled "Compositions of Silico-sodo-calcic glasses and their applications"; U.S. Pat. No. 5,628,155 issued to Nolte, et al. May 13, 1997 and entitled "Fire-resistant structural component with glass pane", all of these U.S. patents being hereby expressly incorporated by reference herein.

Some examples of enameling which may possibly be incorporated in an embodiment of the present invention may be found in: U.S. Pat. No. 6,043,171 issued to Siebers, et al. on Mar. 28, 2000 and entitled "Lead-free and cadmium-free glass compositions for glazing, enameling and decorating glass of glass-ceramics"; U.S. Pat. No. 5,782,999 issued to Kostrubanic on Jul. 21, 1998 and entitled "Steel for enameling and method of making it"; U.S. Pat. No. 5,633,090 issued to Rodek, et al. on May 27, 1997 and entitled "Lead-and cadmium-free glass composition for glazing, enameling and decorating glass", all of these U.S. patents being hereby expressly incorporated by reference herein.

Some examples of fire rated doors which may possibly be incorporated in an embodiment of the present invention may be found in; U.S. Pat. No. 4,748,771 issued to Lehnert, et al. on Jun. 7, 1988 and entitled "Fire door"; U.S. Pat. No. 4,165,591 issued to Fitzgibbon on Aug. 28, 1979 and entitled "Component type building construction system"; U.S. Pat. No. 5,943,824 issued to Tatara on Aug. 31, 1999 and entitled "Fire rated, hinged, swinging door"; U.S. Pat. No. 6,183,023 issued to Yulkowski on Feb. 6, 2001 and entitled "Door with integrated fire exit device"; U.S. Pat. No. 5,896,907 issued to Dever, et al. on Apr. 27, 1999 and entitled "Rolling fire door including a door hold-open/release system"; U.S. Pat. No. 5,886,637 issued to Stuckey on Mar. 23, 1999 and entitled "Door with built-in smoke and fire detector"; U.S. Pat. No. 5,850,865 issued to Hsieh on Dec. 22, 1998 and entitled "Rolling fire door with delayed closing mechanism"; U.S. Pat. No. 5,565,274 issued to Perrone, Jr., et al. on Oct. 15, 1996 and entitled "Fire rated floor door and control system", all of these U.S. patents being hereby expressly incorporated by reference herein.

Some examples of glass fiber reinforced plastic which may possibly be incorporated in an embodiment of the present invention may be found in: U.S. Pat. No. 5,868,080 issued to Wyler, et al. on Feb. 9, 1999 and entitled "Reinforced plastic pallets and methods of fabrication"; U.S. Pat. No. 5,634,847 issued to Shea on Jun. 3, 1997 and entitled "Fire Retardant reinforced plastic duct system"; U.S. Pat. No. 5,448,869 issued to Unruh, et al. on Sep. 12, 1995 and entitled "Composite framing member and window or door assembly incorporating a composite framing member"; U.S. Pat. No. 5,446,250 issued to Oka on Aug. 29, 1995 and entitled "Fiberglass reinforced plastic damping material"; U.S. Pat. No. 4,619,954 issued to Warner, II on Oct. 28, 1986 and entitled "Fiberglass reinforced plastic sheet material with fire retardant filler"; U.S. Pat. No. 4,676,041 issued to Ford on Jun. 30, 1987 and entitled "Corrosion-resistant door and its method of manufacture", all of these U.S. patents being hereby expressly incorporated by reference herein.

The invention as described hereinabove in the context of the preferred embodiments is not to be taken as limited to all of the provided details thereof, since modifications and variations thereof may be made without departing from the spirit and scope of the invention.

NOMENCLATURE

1. Sub-element
2. Sub-element
3. Glass pane
4. Glass pane
5. Profile
6. Edge of glass pane
7. Recess
8. Cavity
9. Connecting element
10. T-groove
11. Seal
12. Edge profile
13. Projection
14. Projection
15. Fireproof laminate
16. Rotation mechanism
17. Space
18. Bar or rod
19. Partial enameling
20. Projection
21. Outer contour
22. Connecting element

What is claimed is:

1. A fire rated wall for blocking the spread of fire in a building from one space to another space, said wall comprising:

at least two wall elements;

each wall element comprising a material with the capability to withstand fire for a predetermined time with a predetermined fire temperature on a fire exposed side of said wall element;

each wall element comprising:

a peripheral portion and a central portion;

said peripheral portion comprising an edge portion;

a frame;

a pair of glass panes supported by said frame;

said pair of glass panes comprising a first glass pane with an outer surface and an inner surface, and a second glass pane with an outer surface and an inner surface;

said inner surfaces of said first and second glass panes facing towards one another;

said outer surfaces of said first and second glass panes facing away from one another;

said first and second glass panes forming a space between them;

said first and second glass panes each comprising a peripheral portion;

each peripheral portion of said first and second glass panes comprising an edge portion;

said first and second glass panes being disposed to extend substantially fully to the edge portion of each wall element;

said frame comprising a profile structure to hold and retain said first and second glass panes;

said profile structure comprising first and second securing portions;

said first and second securing portions each being configured to secure said first and second glass panes at the respective edge portion of each glass pane;

said first and second securing portions each comprising an outer portion disposed in the same plane as each outer surface of said first and second glass panes;

said profile structure further comprising an inner portion extending between said first and second glass panes a predetermined distance towards said central portion of said wall element;

an enamel layer being disposed on each glass pane;

each enamel layer being disposed substantially solely over each peripheral portion of each glass pane to provide an enamel covered portion on each glass pane and a portion not covered by enamel on each glass pane;

the portion not covered by enamel of each glass pane extending over a substantial portion of each glass pane;

each other portion of said first and second securing portions being substantially smaller than each enamel covered portion of each glass pane;

each enamel layer being disposed on the inner surface of each glass pane;

each enamel layer being configured and disposed to conceal just said inner portion of said profile structure from sight;

each enamel layer being configured to provide each wall element on both sides thereof with an appearance that each wall element comprises solely glass from said central portion to said peripheral portion of each wall element;

a laminate structure;

said laminate structure comprising an intumescent material configured to intumesce at a predetermined temperature;

said laminate structure being operably connected to said profile structure; and at least one connector structure;

said at least one connector structure being configured and disposed to connect said at least two wall elements to one another at adjacent peripheral portions thereof to thus provide a fire rated wall for blocking the spread of a fire in a building from one space to another space.

2. The fire rated wall according to claim 1, comprising:

a transparent fireproofing substance being disposed in said space between said first and second glass panes.

3. The fire rated wall according to claim 2, wherein:

said profile structure comprises a hollow structure;

said hollow structure comprising at least a first cavity and a second cavity;

said first cavity having a wall;

said wall comprising a portion configured to connect at least one of: an additional profile element, and said at least one connector structure.

4. A fire rated wall for blocking the spread of fire in a building from one space to another space, said wall comprising:

at least two wall elements;

each wall element comprising a material with the capability to withstand fire for a predetermined time with a predetermined fire temperature on a fire exposed side of said wall element;

each wall element comprising:

a peripheral portion and a central portion;

said peripheral portion comprising an edge portion;

a frame;

a pair of glass panes supported by said frame;

said pair of glass panes comprising a first glass pane with an outer surface and an inner surface, and a second glass pane with an outer surface and an inner surface;

said inner surfaces of said first and second glass panes facing towards one another;

said outer surfaces of said first and second glass panes facing away from one another;
said first and second glass panes forming a space between them;
said first and second glass panes each comprising a peripheral portion;
each peripheral portion of said first and second glass panes comprising an edge portion;
said first and second glass panes being disposed to extend substantially fully to the edge portion of each wall element;
said frame comprising a profile structure to hold and retain said first and second glass panes;
said profile structure comprising first and second securing portions;
said first and second securing portions each being configured to secure said first and second glass panes at the respective edge portion of each glass pane;
said first and second securing portions each comprising an outer portion disposed in the same plane as each outer surface of said first and second glass panes;
said profile structure further comprising an inner portion extending between said first and second glass panes a predetermined distance towards said central portion of said wall element;
a layer being disposed on each glass pane;
each layer being disposed over each peripheral portion of each glass pane to provide a portion covered by a layer on each glass pane and a portion not covered on each glass pane;
each layer being configured to conceal said inner portion of said profile structure from sight;
each outer portion of said first and second securing portions being substantially smaller than each portion covered by a layer of each glass pane;
each layer being disposed on the inner surface of each glass pane;
each layer being configured to provide each wall element on both sides thereof with an appearance that each wall element comprises solely glass from said central portion to said peripheral portion of each wall element;
an intumescent material configured to intumesce at a predetermined temperature;
said intumescent material being operably connected to said profile structure; and
at least one connector structure;
said at least one connector structure being configured and disposed to connect said at least two wall elements to one another at adjacent peripheral portions thereof to thus provide a fire rated wall for blocking the spread of a fire in a building from one space to another space.

5. The fire rated wall according to claim 4, comprising:
a transparent fireproofing substance being disposed in said space between said first and second glass panes.

6. The fire rated wall according to claim 5, wherein:
said profile structure comprises a hollow structure;
said hollow structure comprising at least a first cavity and a second cavity;
said first cavity having a wall;
said wall comprising a portion configured to connect at least one of: an additional profile element, and said at least one connector structure.

7. A fire rated wall for blocking the spread of fire in a building from one space to another space, said wall comprising:

at least two wall elements;
each wall element comprising a material with the capability to withstand fire for a predetermined time with a predetermined fire temperature on a fire exposed side of said wall element;
each wall element comprising:
a peripheral portion and a central portion
said peripheral portion comprising an edge portion;
a frame;
a pair of glass panes supported by said frame;
said pair of glass panes comprising a first glass pane with an outer surface and an inner surface, and a second glass pane with an outer surface and an inner surface;
said inner surfaces of said first and second glass panes facing towards one another;
said outer surfaces of said first and second glass panes facing away from one another;
said first and second glass panes forming a space between them;
said first and second glass panes each comprising a peripheral portion;
each peripheral portion of said first and second glass panes comprising an edge portion;
said first and second glass panes being disposed to extend substantially fully to the edge portion of each wall element;
said frame comprising a profile structure to hold and retain said first and second glass panes;
said profile structure comprising first and second securing portions;
said first and second securing portions each being configured to secure said first and second glass panes at the respective edge portion of each glass pane;
said first and second securing portions each comprising an outer portion disposed in the same plane as each outer surface of said first and second glass panes;
said profile structure further comprising an inner portion extending between said first and second glass panes a predetermined distance towards said central portion of said wall element;
a layer being disposed on each glass pane;
each layer being disposed over each peripheral portion of each glass pane to provide a portion covered by a layer and being configured to conceal said inner portion of said profile structure from sight;
each outer portion of said first and second securing portions being substantially smaller than each portion covered by a layer of each glass pane;
each layer being disposed on the inner surface of each glass pane;
each layer being configured to provide each wall element on both sides thereof with an appearance that each wall element comprises solely glass from said central portion to said peripheral portion of each wall element;
an intumescent material configured to intumesce at a predetermined temperature;
said intumescent material being operably connected to said profile structure; and
at least one connector structure;
said at least one connector structure being configured and disposed to connect said at least two wall elements to one another at adjacent peripheral portions thereof to thus provide a fire rated wall for blocking the spread of a fire in a building from one space to another space.

8. The fire rated wall according to claim 7, comprising:

a transparent fireproofing substance being disposed in said space between said first and second glass panes.

9. The fire rated wall according to claim 8, wherein:

said first and second glass panes each comprise a safety glass;

said fireproofing substance comprising one of: a fireproofing gel, and a fireproof glass.

10. The fire rated wall according to claim 9, wherein:

said profile structure comprises a hollow structure;

said hollow structure comprising at least a first cavity and a second cavity;

said first cavity having a wall;

said wall comprising a portion configured to connect at least one of: an additional profile element, and said at least one connector structure.

11. The fire rated wall according to claim 10, wherein:

said profile structure comprises projecting portions;

said projecting portions being configured to cover at least a portion of each edge portion of each glass pane.

12. The fire wall according to claim 11, comprising:

a first edge profile;

said first edge profile comprising a pair of leg portions;

each edge portion of each glass pane comprising a recessed step portion;

each recessed step portion being disposed and configured to be accepted between a corresponding leg portion of said first edge profile and said inner portion of said profile structure.

13. The fire rated wall according to claim 11, wherein:

both said first glass pane and said second glass pane comprise a beveled edge portion adjacent said edge portion of each glass pane; and a second edge profile;

said second edge profile being configured and disposed to cover said beveled edge portions.

14. The fire rated wall according to claim 12, wherein:

said edge profile comprises a T-shaped groove; and a seal structure being disposed in said T-shaped groove;

said seal structure being configured to conceal a gap between adjacent wall elements.

15. The fire rated wall according to claim 14, wherein:

said intumescent material comprises at least one fire rated laminate;

said fire rated laminate being attached to said profile structure.

16. The fire rated wall according to claim 15, wherein:

said edge profile is connected to said inner portion of said profile structure.

17. The fire rated wall according to claim 16, wherein:

said at least one connector structure comprises:
 a rod-shaped element;
 a hook structure at each end of said rod-shaped element; and
 a mechanism connected to said rod-shaped element, centrally between said hook structures;
 said mechanism being configured to align said hook structure to said inner portion of each wall element.

18. The fire rated wall according to claim 17, wherein:

said mechanism is configured with one of: a square nut head, and a hexagonal nut head;

said mechanism comprises holes in said rod-shaped element;

said inner portion of each wall element is configured with holes;

each said hook structure being configured to be passed through its corresponding hole;

each said hook structure being further configured to be fixed in position in its corresponding wall element upon rotation of said mechanism to thus connect said wall elements to one another;

said profile structure and said edge profile comprise one of: plastic, fiberglass-reinforced plastic, steel, wood, and light alloy.

19. The fire rated wall according to claim 18, wherein:

a fire rated door is included in at least one wall element;

said fire rated door comprising one of: a single-panel side-hung door, a double-panel side-hung door, a single-panel swinging door, and a double-panel swinging door; and at least one wall element comprising a portion comprising a non-transparent sheet;

said sheet comprising one of: plastic, wood, steel, and light alloy.

20. The fire rated wall according to claim 17, comprising at least one of:

a transparent fireproofing substance being disposed in said space between said first and second glass panes;

said first and second glass panes each comprise a safety glass;

said fireproofing substance comprising one of: a fireproofing gel, and a fireproof glass;

said profile structure comprises a hollow structure;

said hollow structure comprising at least a first cavity and a second cavity;

said first cavity having a wall;

said wall comprising a portion configured to connect at least one of: an additional profile element, and said at least one connector structure;

said profile structure comprises projecting portions;

said projecting portions being configured to cover at least a portion of each edge portion of each glass pane;

a first edge profile;

said first edge profile comprising a pair of leg portions;

each edge portion of each glass pane comprising a recessed step portion;

each recessed step portion being disposed and configured to be accepted between a corresponding leg portion of said first edge profile and said inner portion of said profile structure;

both said first glass pane and said second glass pane comprise a beveled edge portion adjacent said edge portion of each glass pane;

a second edge profile;

said second edge profile being configured and disposed to cover said beveled edge portions;

said edge profile comprises a T-shaped groove; and a seal structure being disposed in said T-shaped groove;

said seal structure being configured to conceal a gap between adjacent wall elements;

said intumescent material comprises at least one fire rated laminate;

said fire rated laminate being attached to said profile structure;

said edge profile is connected to said inner portion of said profile structures;

said at least one connector structure comprises:
- a rod-shaped element;
- a hook structure at each end of said rod-shaped element; and
- a mechanism connected to said rod-shaped element, centrally between said hook structure; said mechanism being configured to align said hook structure to said inner portion of each wall element;

said mechanism is configured with one of: a square nut head, and a hexagonal nut head;

said mechanism comprises holes in said rod-shaped element;

said central portion of each wall element is configured with holes;

each said hook structure being configured being to be passed through a corresponding hole;

each said hook structure being further configured to be fixed in position in its corresponding wall element upon rotation of said mechanism to thus connect said wall elements to one another;

said profile structure and said edge profile comprise one of: plastic fiberglass-reinforced plastic, steel, wood, and light alloy;

a fire rated door is included in at least one wall element;

said fire rated door comprising one of: a single-panel side-hung door, a double-panel side-hung door, a single-panel swinging door, and a double-panel swinging door; and at least one wall element comprises a portion comprising a non-transparent sheet;

said sheet comprising one of: plastic, wood, steel, and light alloy.

* * * * *